(12) United States Patent
Burmester

(10) Patent No.: US 6,179,003 B1
(45) Date of Patent: Jan. 30, 2001

(54) ACTUATING DEVICE FOR DOUBLE SEAT VALVE WITH CLEANABLE SEAT

(75) Inventor: Jens Burmester, Grambek (DE)

(73) Assignee: Tuchenhagen GmbH, Buchen (DE)

( * ) Notice: Under 35 U.S.C. 154(b), the term of this patent shall be extended for 0 days.

(21) Appl. No.: 09/477,553

(22) Filed: Jan. 4, 2000

(30) Foreign Application Priority Data

Jan. 7, 1999 (DE) ............................................. 199 00 239

(51) Int. Cl.$^7$ ...................................................... F16K 1/44
(52) U.S. Cl. ............................ 137/614.18; 137/614.11; 137/613; 251/63.5
(58) Field of Search .................. 137/614.18, 614.11, 137/613; 251/63.5, 63, 62

(56) References Cited

U.S. PATENT DOCUMENTS

| | | | |
|---|---|---|---|
| 6,014,983 | * | 4/2000 | Sondergaard et al. ...... 137/614.18 X |
| 6,047,730 | * | 4/2000 | Coura et al. ................... 137/614.18 |

FOREIGN PATENT DOCUMENTS

WO97/22821    6/1997  (WO) .

\* cited by examiner

Primary Examiner—Kevin Lee
(74) Attorney, Agent, or Firm—Venable; John P. Shannon

(57) ABSTRACT

The invention refers to an actuating device for a double seat valve with cleanable seat, provided with two individually moveable closure members, which can be brought, additional to the open position, independent from each other, to a partial open position, wherein it shall be secured that the partial stroke movement to be carried out during the seat cleansing of the dependently actuated closure member is possible with relatively low pressures of the pressure medium, without the necessity to take pressure compensation measures at the respective closure member or for the increase of the diameter of the actuating piston. Furthermore it shall be possible, if required, to effect also the opening movement of the double seat valve with the conditions named above. This is achieved in that an additional piston (108\*) is provided between the first piston (107) and the valve housing (2), which is externally supported in the drive housing (100) in sealed and moveable manner and is internally rigidly connected with the second piston (108), that the first piston (107) is internally supported on the assembly (108, 108\*) consisting of the second piston (108) and the additional piston (108\*) in sealed and moveable manner, and that the second piston (108) and the additional piston (108\*) are acted upon by pressure medium in the same direction (FIG. 1).

9 Claims, 2 Drawing Sheets

ACTUATING DEVICE FOR DOUBLE SEAT VALVE WITH CLEANABLE SEAT

BACKGROUND OF THE INVENTION

The invention refers to an actuating device for a double seat valve with cleanable seat according to the preamble of claim 1.

A generic actuating device for a double seat valve with cleanable seat is known from WO 97/22821. This solution is an installation friendly and space saving actuating mechanism, in which the main adjustment mechanism and the individual adjustment mechanisms are combined in a common drive housing and externally adjustable partial stroke limitations for both closure members are provided.

The actuating devices for such double seat valves have to be designed such that they are able to transfer the closure members to an open position against product under pressure present in the drive housing, if applicable, on the one hand, and to bring it, on the other hand, as a counter move to the closed position and to reliably seal it there against the product pressure on their seating surface. If the two closure members are each a seating plate (WO97/22821, FIG. 1), a force generated by the pressure in the associated valve housing acts upon the independently actuated closure member (in the actual case this is, referred to the illustration position, the closure member situated at the bottom) in its opening direction. Thereby, the closing force of the actuating device usually locking by elastic spring force acting upon the seating surface is reduced. In the design of the spring closing forces such influences are either considered or the closure member in question is provided with a so-called pressure compensating piston, which can be dimensioned such that no or no substantial axial forces resulting from the product pressure act upon the closure member (closure member 4 according to FIG. 1 in the WO 97/22821). Above that, such a pressure compensating piston secures the double seat valve also against being pushed open by shortly acting pressure impacts in the associated valve housing, which can constitute a multiple of the nominal product pressure.

If the independently actuated closure member named above is formed as a valve piston, the same measures are taken in order to secure against pushing open and pressure impacts (WO 97/22821, FIG. 6).

The dependently actuated closure member (in the present case this is, relating to the illustration position, the closure member situated at the top), which is designed as seating plate in the double seat valve according to WO 97/22821 in the embodiment according to FIG. 1 as well as according to FIG. 6, is, in the embodiment shown in FIG. 1, pressed onto the associated seating surface with a force arising from the respective pressure situation due to product pressure acting as planned, but also due to pressure impacts occurring unplanned additionally to the locking force, which results from the initial stressing of the spring in the actuating device. In the course of this the product pressure in the associated valve housing weighs on the whole surface in question of the closure member such that the actuating device besides the locking force for securing a sufficient sealing effect in the valve seat also has to provide the additional locking force resulting from product pressure and closure member surface. This is implemented by a corresponding design of the associated actuating piston acted upon by pressure medium. As the operating pressures of the pressure medium to be provided as a rule have a certain standardised magnitude, which cannot simply be enlarged, the adjustment of the actuating device regarding the opening forces to be provided is effected by a corresponding design of the diameter of the actuating piston. A large diameter of the actuating piston and therewith of the actuating device results in turn in higher costs, which, as a rule, increase more than linearly proportional with growing diameter.

In contrast, in the embodiment according to FIG. 6 (WO 97/22821) the additional closing forces resulting from the product pressure are compensated due to the pressure compensating piston arranged at the closure member in question, such that the opening of the associated closure member against the product under pressure present in the associated valve housing is generally eased by the provision of the pressure compensating piston.

The problem described above arises on the one hand during the seat cleansing of the dependently actuated closure member, which in the course of this has to be lifted by a partial stroke against the product under pressure present in an associated valve housing. Therefore, the respective piston of the associated individual adjustment mechanism has to be dimensioned according to the criteria described above. Furthermore, this problem also occurs during each opening stroke of the double seat valve. The opening movement is launched by the actuation of the independently actuated closure member, which is not subject to the problem described above. However, after a partial stroke it comes to rest against the dependently actuated closure member and transfers the latter also into the opened position during its further opening movement. Accordingly the same dimensioning problem arises for the actuating piston of the independently actuated closure member, as the opening movement and accordingly the force variety after abutment of the independently actuated closure member at the dependently actuated one are substantially determined by the pressure situations at the latter.

The contexts described above are a general problem and not only a problem, which occurs in a double seat valve according to WO 97/22821. Also the locking valve described in DE 195 48 860 A1, for example, is subject to the same problem, which is identically designed regarding the closure member configuration and the provided pressure compensation measures as the double seat valve according to WO 97/22821 in the embodiment used there according to FIG. 1. In this known locking valve the easier control and overcoming of the closing forces resulting from the product pressure are not concerned, but the considerations head towards a different direction. It is proposed among other things to increase the contact pressure of the top valve plate in the course of the seat cleansing of the bottom valve plate in that an actuating piston of the individual adjustment mechanism associated with the top closure member is additionally acted upon with pressure in closing direction.

As it can be recently observed that especially globally represented operators of large plants of the food and beverage industry rather provide or favour relatively low pressures of the pressure medium to be provided, the question arises regarding an optimum and with it low-cost design of actuating devices, which shall be operated with these pressures.

The arrangement of a pressure compensating piston at the dependently actuated closure member, as proposed in the embodiment according to FIG. 6 of WO 97/22821, is not in every case the solution of the first choice. With predetermined pressure of the pressure medium, such a construction results in smaller diameters of the actuating pistons and accordingly of the actuating device in comparison to a solution without pressure compensating piston, but pressure compensating pistons comprise sufficiently known disadvantages, especially if they have to extend into the associated valve housing by the distance of the opening stroke due to kinematic reasons. Firstly, such pressure compensating pistons narrow the flow cross section in the valve housing, into which they engage, such that the velocity losses increase substantially, secondly, the pistons having necessarily diameters of large dimensions create sealing problems and hygienic problems in the area of their valve housing passage.

SUMMARY OF THE INVENTION

The object of the present invention is to design the actuating device for the dependently actuated closure member of a generic double seat valve with cleanable seat such that the partial stroke movement to be carried out during the seat cleansing of the closure member is possible with relatively low pressures of the pressure medium, without the necessity of taking pressure compensating measures regarding the respective closure member or for the diameter increase of the actuating piston. Furthermore, if required, also the opening movement of the double seat valve shall be performable under the conditions named above.

The object is achieved by the features in the characterising part of claim 1. Advantageous embodiments of the proposed actuating device for a double seat valve with cleanable seat are described in the subordinated claims.

The solution is achieved surprisingly easily in that in the space, which receives the individual adjustment mechanisms for the two closure members, i.e. an additional piston is received between the first piston of the first individual adjustment mechanism and the valve housing, which is externally supported in the drive housing in sealed and moveable manner, and is internally fixedly connected with the second piston. In the course of this the first piston is guided in sealed and movable manner on the assembly consisting of the second piston and the additional piston. A further space acted upon by the pressure medium is formed thereby adjacent to a space acted upon by pressure medium between the drive housing and the additional piston, which space is located between the first and the second piston, such that during corresponding pressure medium supply in the same direction an efficient increase of the actuating surface of the actuating piston assembly for the dependently actuated closure member is achieved, without employing the diameter increase required up to now. Such a measure for the increase of the piston surface, without enlarging the piston diameter, is known per se regarding piston drives acted upon by pressure medium. They are called "stack drives" in this connection.

Furthermore, the proposed solution provides the premises, that the possibility to provide externally adjustable partial stroke limitations for both closure members is also given after arrangement of the additional piston in the individual adjustment mechanisms.

The proposed solution for the first time proposes a so-called "stacked" lift drive for the generation of a partial stroke movement within the framework of an individual adjustment mechanism. In principle, the pressure medium spaces to be acted upon by pressure medium in the same direction and associated with the two effective piston surfaces can be separately provided with a pressure medium supply. According to an advantageous design of the proposed actuating device it is provided that the pressure medium supply to the second piston and to the additional piston is effected via a second pressure medium supply provided commonly for both pistons in the drive housing. This can be effected in that, for example, starting from the first pressure medium space defined by the additional piston a pressure medium supply is provided to the second pressure medium space via adequate supply bores in the additional piston.

If the product pressures and/or the pressure of the provided pressure medium is/are such that a "stacking" of the actuating device for the generation of the partial stroke movement of the dependently actuated closure member is not required, the area of the actuating piston assembly to be provided can be reduced in that the second piston is omitted and only the additional piston is received in the individual adjustment mechanism. As provided in a further embodiment of the proposed actuating device, this is possible in that the additional piston comprises a cylindrical lug on its side facing the second piston, on which the first piston is supported in sealed and moveable manner on the outside and at the free end of which the second piston is releasable attached. If the second piston is omitted, the additional piston as well as the first piston remain completely operative, as both maintain their external sealing guidance in the drive housing and the respective internal sealing guidance also remains unchanged.

Furthermore, the proposed piston assembly of the individual adjustment mechanisms makes it possible to create in the simplest manner an access to the piston of the individual adjustment mechanisms from the spacer housing connecting the drive housing with the valve housing, and accordingly to provide the possibility, when necessary, to provide externally adjustable partial stroke limitations for both closure members. In a preferred embodiment of the actuating device proposed this is effected by means of variability of the stop position of the piston, which is provided for the partial stroke limitation of the closure members relative to the pertinent adjusting rod on the latter from the exterior of the actuating mechanism in the area of a spacer housing connecting the latter to the valve housing.

Another advantageous embodiment of the actuating device proposed provides in this context that the pertinent stop position of the piston is determined by stop sleeves interpenetrating in the axial direction, through which the adjusting rods extend, which are positioned concentrically relative to each other, the exterior stop sleeve in the drive housing and the interior stop sleeve in the exterior sleeve each being mounted so as to be adjustable and stationary.

The device proposed is particularly installation friendly and can be additionally modularly equipped, if the drive housing is divided into a first and a second housing component, the former receiving the main adjustment mechanism and the latter the individual adjustment mechanisms. This makes it possible to premount first the main adjustment mechanism in the first housing component and the two individual adjustment mechanisms in the second housing component and merely join the two housing components in order to control the force to be generated by a second spring in the drive housing, which force acts between the two closure members and is simple to contain. Above that the proposed actuating device can also be used without the individual adjustment mechanisms, if a seat cleaning of both closure members is not desired or required.

Furthermore, the modular construction of the proposed actuating device allows for the arrangement of an additional full stroke actuating device between the main adjustment mechanism and the individual adjustment mechanisms in order to "stack" the actuating device for the opening movement of the double seat valve. In this context it is envisaged according to a further embodiment of the proposed actuating device that an additional full stroke actuating device is provided between the main adjustment mechanism and the individual adjustment mechanisms, which comprises an additional full stroke piston in an intermediate housing located between a first housing component and a second housing component, that the latter is equipped with a cylindrical lug on the side of the main piston of the main adjustment mechanism, which extends through a bottom of the intermediate housing in sealed and moveable manner and which can be brought into a stop position on the main piston, and that pressure medium acts upon the main piston and the additional full stroke piston in the same direction. By this measure also the opening movement of the dependently actuated closure member can be effected by a "stacked" main adjustment mechanism in the course of the opening movement of the double seat valve, after the independently actuated closure member has come to rest against the dependently actuated closure member and transfers the latter also into the open position during the further opening stroke.

The actuating device is facilitated regarding the pressure medium supply of the "stacked" main adjustment mechanism, if the pressure medium supply to the main piston and the additional full stroke piston is effected through a second pressure medium supply provided commonly for both pistons, as this is provided by a further embodiment of the proposed actuating device. In this context it is proposed further to provide the pressure medium supply via a bore within the adjusting rod.

BRIEF DESCRIPTION OF THE DRAWINGS

An exemplified embodiment of the proposed actuating device according to the invention is illustrated in the drawing and is described below.

DETAILED DESCRIPTION OF THE PREFERRED EMBODIMENT

Figure 1:
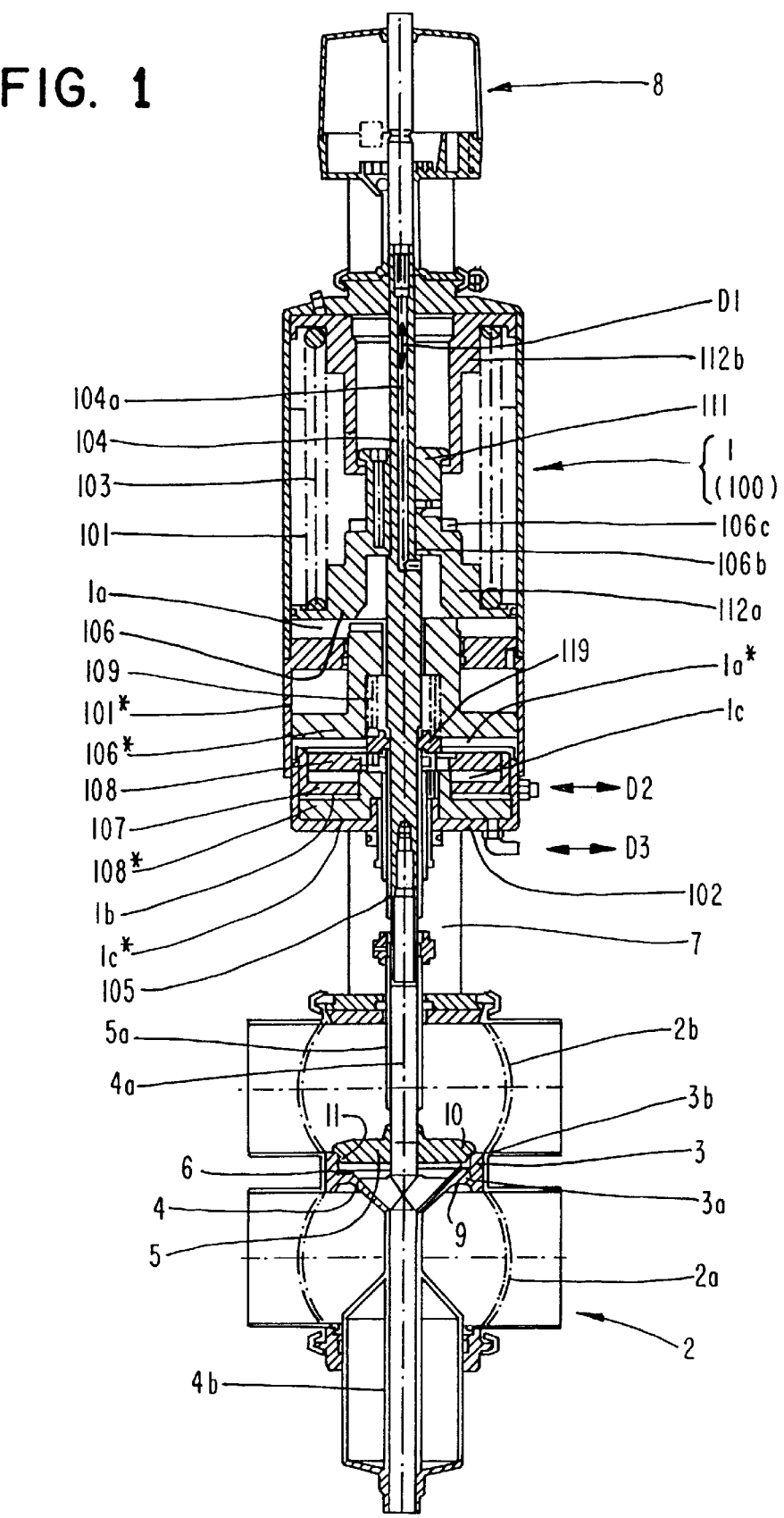
FIG. 1 shows a cross-section through a double seat valve with cleanable seat having an actuating device according to the invention in a preferred embodiment, the double seat valve being shown in its closed position.

An actuating device (FIG. 1) actuates a double seat valve with cleanable seat, which consists essentially of a valve housing 2 with a first and a second valve housing component 2*a* und 2*b*, two individually movable closure members 4 and 5 with adjusting rods 4*a* or 5*a*, respectively associated with the latter, a spacer housing 7 connecting the valve housing 2 to the actuating device 1 and an answer back signal housing 8 for monitoring individual positions of the double seat valve. The two closure members 4 and 5 designed as seating plates with associated seating seal 9 and 10 form between them, with the double seat valve in both the closed and the open positions, a leakage cavity 6, which acts as a seal 11 from the surroundings when the double seat valve is in the open position and is connected to the surroundings of the double seat valve by a discharge pipe 4*b* extending through the first valve housing 2*a* mounted on the independently actuated closure member 4. A first seating surface 3*a* is formed on a first seating ring 3 provided between the valve housing components 2*a* and 2*b* for the first closure member 4 and a second seating surface 3*b* for the second closure member 5.

One function assigned to the actuating device 1 is that of transferring the double seat valve from its closed position to its open position and then back to its closed position. For this purpose a main adjustment mechanism 1*a* closing by means of spring force is provided in a common drive housing 100, which may consist, for example, of a first and a second housing component 101 or 102; this adjustment mechanism is of known design consisting essentially of a main piston 106 acted upon by a main spring 103 and of a first pressure medium supply D1, the latter being formed by means of a bore 104*a* in an internal adjusting rod 104. The main piston 106 is rigidly connected either directly or, as in the illustrated exemplified embodiment, indirectly via the internal adjusting rod 104 to the internal adjusting rod 4*a* (valve rod). The external adjusting rod 5*a* of the second closure member 5, which is in the form of a hollow rod, extends directly or, as shown in the exemplary embodiment, indirectly via an external adjusting rod 105 into the actuating device 1 and there holds a bearing bracket 119 for a spring bar of a second spring 109 supported on the main piston 106 on the other side or the additional full stroke piston 106*, which is in its stop position on the main piston 106. In the position shown, with the double seat valve closed, the initially stressed main spring 103 presses the first closure member 4 against the first seating surface 3*a*, while the second spring 109 presses the second closure member 5 against the second seating surface 3*b*.

There are also provided in the actuating device 1, in the second housing component 102, two individual adjustment mechanisms 1*b* and 1*c*, the latter with its second piston 108 being associated with the external adjusting rod 105 or the hollow rod 5*a* and accordingly with the dependently actuated closure member 5. The individual adjustment mechanism 1*b* has a first piston 107, which is associated with the independently actuated first closure member 4 via the internal adjusting rod 104 or the valve rod 4*a*.

Figure 2:
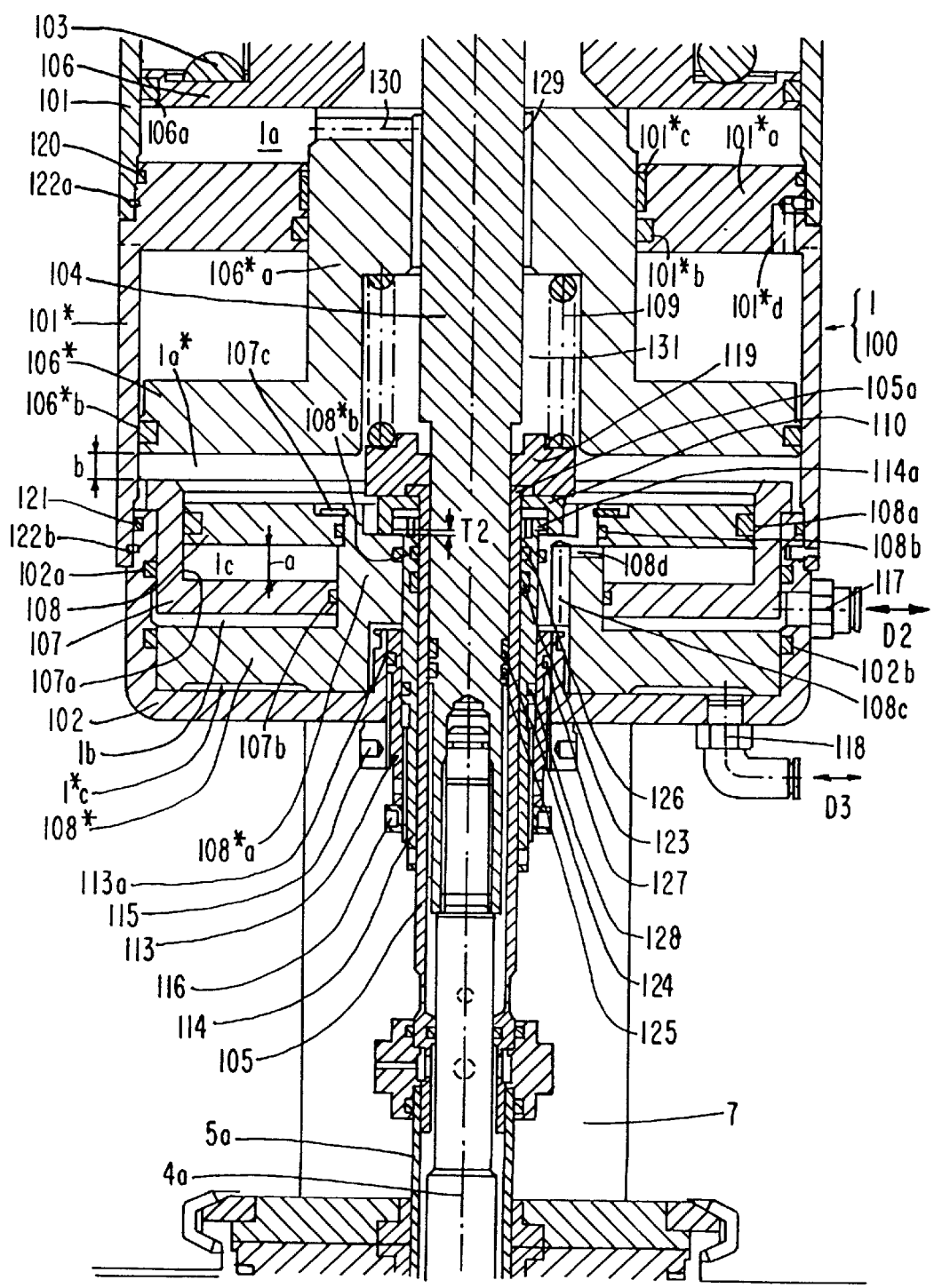
FIG. 2 shows a detailed illustration of the actuating device according to FIG. 1 in a cutaway section and on a larger scale.

The open position of the double seat valve is brought about by pressure medium acting upon the underside of the main piston 106 in the main adjustment mechanism 1*a* via the pressure medium supply D1 through the bore 104*a* arranged in the internal adjusting bar 104. Thereby, the main piston 106 moves upward against the force of the main spring 10 until it comes to rest against a second cage end component 112*b* adjacent to the spring 103 on one side, by way of a spacer ring 106*c*, which is arranged on a first cage end component 112*a*, which is rigidly connected to the main piston 106 and adjacent to the main spring 103 on the other side. An intermediate cage component 111, which on the one hand is rigidly connected to the first cage end component 112*a* and on the other side has a frictional and/or form-fitting connection with the internal adjusting rod 104, functions to guide the two cage components 112*a* and 112*b* relative to each other, and it encloses the main spring 103 in interaction with the cage end components 112*a*, 112*b* by means of a recess not indicated in detail in form-fitting manner to the required initial tension. Further details of the proposed actuating device 1 and indications and explanations relating to the reference symbols in FIG. 1 not mentioned so far, especially regarding the individual adjustment mechanisms 1*b* and 1*c* and the additional actuating devices for full stroke and partial stroke proposed by the invention can be gathered from the enlarged illustration according to FIG. 2.

The first piston 107 (FIG. 2) is cup-shaped and is sealed externally so as to be moveable in the second housing component 102 via a first piston seal 102*a* and internally by an internal piston seal 107*b* on a cylindrical lug 108* of an additional piston 108*. On its side facing the main adjustment mechanism 1a the first piston 107 is provided with a cylindrical recess 107a, in which the second piston 108 is externally arranged sealed by an external piston seal 108a and movable. Internally the second piston 108 is rigidly, but detachable connected to the cylindrical lug 108*a of the additional piston 108* by means of a connection means 107c. An internal piston seal 108b provides the sealing between the second piston 108 and the cylindrical lug 108*a. The additional piston 108* is externally moveably sealed in the second housing component 102 by a second piston seal 102b and internally by a seal 108*b on an internal stop sleeve 114. Thus the first piston 107 in interaction with the second piston 108 and a part of the cylindrical lug 108*a form a pressure medium space not indicated in detail of the second individual adjustment mechanism 1c, which is connected to a second pressure medium space not indicated in detail via pressure medium bores 108c and 108d in the additional piston 108*, said second space being formed between the additional piston 108* and the second housing component 102 and being associated with an additional partial stroke actuating device 1c*. The additional partial stroke actuating device 1c* receives a third pressure medium supply D3 through a second pressure medium connection 118. The first piston 107 and the additional piston 108* in interaction with the second housing component 102 and a part of the cylindrical lug 108*a further form a third pressure medium space not indicated in detail, which is associated with the first individual adjustment mechanism 1b and receives a second pressure medium supply D2 via a first pressure medium connection 117.

An additional full stroke actuating device 1a* is provided between the main adjustment mechanism 1a and the individual adjustment mechanisms 1b, 1c and 1c*, which comprises an additional full stroke piston 106* in an intermediate housing 101* arranged between the first housing component 101 and the second housing component 102. On the side of the main piston 106 the additional piston 106* is provided with a cylindrical lug 106*a, which moveably extends through a bottom 101*a of the intermediate 101* in a sealed manner and can be brought to a stop position on the main piston 106 under the initial stressing force of the second spring 109. The additional full stroke piston 106* is moveably sealed externally by a seal 106*b in the intermediate housing 101* and the cylindrical lug 106*a externally by a seal 101*b arranged in the bottom 101*a and, above that, is guided in a guide ring 101*c there. On the inside the cylindrical lug 106*a forms a ring gap 129 with the internal adjusting rod 104, through which a part of the pressure medium (first pressure medium supply D1) supplied through the bore 104a is also supplied to the pressure medium space indicated not in detail and arranged below the additional full stroke piston 106*, which space is associated with the additional full stroke actuating device 1a*. The connection between the ring gap 129 and the pressure medium space arranged below the main piston 106, not indicated in detail and associated with the main adjustment mechanism 1a is provided by a bore 130, which penetrates the cylindrical lug 106*a preferably in radial direction. The pressure medium to act upon the additional full stroke piston 106* reaches a spring chamber 11 via the ring gap 129, in which the second spring 109 is arranged. A space formed between the additional full stroke piston 106*, its cylindrical lug 106*, the bottom 101*a and the intermediate housing 101* is connected with the surroundings of the double seat valve via a bore 101*d formed in the bottom 101*a, such that this space is ventilated during the switching movement of the double seat valve.

The pressure medium space associated with the main adjustment mechanism 1a is formed between the main piston 106 and the bottom 101*a in interaction with the first housing component 101 and a part of the cylindrical lug 106*a. The main piston 106 is externally sealed against the first housing component 101 by means of a first main piston seal 106a and internally against the internal adjusting rod 104 by means of a second main piston seal 106b (cf. FIG. 1 in this respect). The space acted upon by pressure medium below the main piston 106 is sealed against the surroundings of the double seat valve by means of a first housing seal 120 sealing the housing components 101 and 101* against each other. In the same way the space acted upon by pressure medium below the additional full stroke piston 106* is sealed against the surroundings of the double seat valve by means of a second housing seal 121 sealing the housing components 101* and 102 against each other. The formfitting connection between the first housing component 101 and the intermediate housing 101* and between the intermediate housing 101* and the second housing component 102 is secured by a first or second retaining ring 122a or 122b, respectively.

The sealing of the space acted upon by pressure medium below the additional full stroke piston 106* against the surroundings of the double seat valve is effected in the area of the adjusting rods 104 and 105 by a hollow rod seal 126 arranged between the external adjusting rod 105 and the internal stop sleeve 114 and two additional seals 127 and 128. The seal 127 seals an external stop sleeve 113 concentrically enclosing the internal stop sleeve 114, externally against the second housing component 102, while the seal 128 seals the external stop sleeve 113 internally against the internal stop sleeve 114. The numbers 12 and 124 indicate a first and a second guide ring, which ensure perfect displacement of the external adjusting rod 105 inside the internal adjusting rod 114 or a displacement of the internal adjusting rod 104 inside the external adjusting rod 105, respectively.

The external stop sleeve 113 is adjustably mounted in the second housing component 102 by way of threading and can be locked in position against it by a first lock nut 115. The internal stop sleeve 114 may be similarly adjusted and locked in position in the external stop sleeve 113 by means of a second lock nut 116.

The external stop sleeve 113 further comprises a stop head 113a performing the function of limiting the partial stroke of the first piston 107. If the latter is displaced upward by a stroke distance indicated as a, to come to rest against the second piston 108, the first piston 107, after completing a partial stroke movement indicated as b, comes to rest against the additional full stroke piston 106* and displaces the latter a partial stroke distance T1=a−b. As the additional full stroke piston 106* is always in a stop position on the main piston 106 due to the initial stressing of the second spring 109, also the internal adjusting rod 104 connected to the main piston 106 (cf. FIG. 1 in this respect) and accordingly the associated independently actuated closure member 4 are transferred to the corresponding partly open position T1 by the partial stroke T1 named above. By the axial displacement of the external stop sleeve 113 and accordingly of the stop head 113a, the stroke distance a between the first piston 107 located in an invariable stop position on the second housing component 102 and the second piston 108 is changed such that the variable partial stroke T1 mentioned above is obtained as the difference between the variable stroke distance a and the invariable stroke distance b, which depends on the construction. Thereby the closure member 4 has left its associated first seating surface 3a by the partial stroke T1=a−b , and a so-called seat cleansing from the first valve housing component 2a via the cleared first seating surface 3a into the leakage cavity 6 becomes possible. The cleansing medium gathered in this manner from the first valve housing component 2a drains from the leakage cavity 6 via the discharge pipe 4b into the surroundings of the double seat valve (cf. also FIG. 1).

If pressure medium is applied to the assembly consisting of the second piston 108 and the additional piston 108* by way of the second pressure medium supply 118 (third pressure medium supply D3), the piston assembly 108, 108* moves upward and ultimately comes to rest against a recess 114a at the top end of the internal stop sleeve 114. The piston assembly 108, 108* displaces a spacer 110 in the course of this partial stroke movement, which is located in the corresponding direction of movement in a formfitting entrainment connection with a hollow rod head 105a in the form of a recess of the external adjusting rod 105, upward by a partial stroke T2. As a result the external adjusting rod 105 and accordingly the hollow rod 5a of the dependently actuated closure member 5 are also displaced upward by this partial stroke T2, so that the corresponding partly open position of the closure member 5 regarding the second seating surface 3b is obtained. In this position cleansing medium can now flow from the second valve housing component 2b via the now cleared second seating surface 3b into the leakage cavity 6 and from this point reach the surroundings of the double seat valve via the discharge pipe 4b (cf. FIG. 1).

What is claimed is:

1. Actuating device for a double seat valve with cleanable seat provided with two individually movable closure members (4, 5), of which one member is an independently actuated closure member (4) that comes to rest against the other member (5) after a partial stroke and, during further opening movement, transfers said other member also to an open position, and which, in addition to the open position, may independently be brought to a partly open position, with an actuating mechanism (1) having a main adjustment mechanism (1a) and first and second individual adjustment mechanisms (1b, 1c) associated with the respective closure members (4,5), the individual adjustment mechanisms (1b, 1c) being located between the main adjustment mechanism (1a) and a valve housing (2) and being engaged with adjusting rods (4a, 104; 5a, 105) of the closure members (4,5) via a first piston and a second piston, which are moveably supported on the adjusting rods in one direction and can be brought into an entrainment connection with the adjusting rods in the opposite direction, with the first piston (107) of the first individual adjustment mechanism (1b) for the partly open position (T1) of the independently actuated closure member (4), which is externally arranged in a drive housing (100) of the actuating mechanism (1) in a sealing and movable manner, and with the second piston (108) of the second individual adjustment mechanism (1c) for the partly open position (T2) of the dependently actuated closure member (5), which is arranged in a sealing and moveable manner externally in a cylindrical recess (107a) of the first piston (107), which is facing the main adjustment mechanism (1a), and internally directly or indirectly on the associated valve rod (105), characterised in that an additional piston (108*) is arranged between the first piston (107) and the valve housing (2), which is externally supported in the drive housing (100) in a sealed and moveable manner, and is internally rigidly connected to the second piston (108), that the first piston (107) is supported in a sealed and moveable manner internally on the assembly (108, 108*) comprising the second piston (108) and the additional piston (108*), and that the second piston (108) and the additional piston (108*) are acted upon by a pressure medium in the same direction.

2. Actuating device according to claim 1, characterised in that the pressure medium supply to the second piston (108) and to the additional piston (108*) is effected through a second pressure medium connection (118) commonly provided for both in the drive housing (100; 102).

3. Actuating device according to claim 1, characterised in that the additional piston (108*) comprises a cylindrical lug (108*a) on a side of the additional piston facing the second piston (108), on which the first piston (107) is externally supported in a sealed and moveable manner and at the free end of which the second piston (108) is detachably mounted.

4. Actuating device according to claim 1, characterised in a stop position of the pistons (107, 108 or 108*, 108*a) respectively is provided for the partly open position of the closure members (4,5) in relation to the respective adjusting rod (4a or 104, 5a or 105, respectively), the stop position being adjustable from the outside of the actuating mechanism (1) in the area of a spacer housing (7) connecting the actuating mechanism with the valve housing (2).

5. Actuating device according to claim 4, characterised in that the respective stop position of the pistons (107, 108 or 108*, 108*a) is determined by means of stop sleeves (113, 114) interpenetrating each other in axial direction, through which the adjusting rods (4a or 104, 5a or 105, respectively), arranged concentrically to each other, are passed, one of the stop sleeves being an external stop sleeve, and the other of the stop sleeves being an internal stop sleeve, the external stop sleeve (113) being arranged in the drive housing (100) and the inner stop sleeve (114) in the external one (113), in an adjustable or fixable manner, respectively.

6. Actuating device according to claim 1, characterised in that the drive housing (100) is divided into a first housing component and a second housing component (101 or 102, respectively), the first housing component (101) receiving the main adjustment mechanism (1a) and the second housing component (102) the individual adjustment mechanisms (1b, 1c, 1c*).

7. Actuating device according to claim 1, characterised in that an additional full stroke actuating device (1a*) is arranged between the main adjustment mechanism (1a) and the individual adjustment mechanisms (1b, 1c, 1c*), which comprises an additional full stroke piston (106*) in an intermediate housing (101*) located between a first housing component (101) and a second housing component (102), that said piston is provided with a cylindrical lug (106*a) on the side of the main piston (106) of the main adjustment mechanism (1a), which extends through a bottom (101*a) of the intermediate housing (101*) in sealed and moveable manner, and which can be brought to a stop position on the main piston (106), and that the main piston (106) and the additional full stroke piston (106*) are acted upon by pressure medium in the same direction.

8. Actuating device according to claim 7, characterised in that the pressure medium supply to the main piston (106) and to the additional full stroke piston (106*) is effected via a second pressure medium supply (D1) provided commonly for both.

9. Actuating device according to claim 8, characterised in that the pressure medium supply (D1) is effected via a bore (104a) inside the adjusting rod (104).

* * * * *